(12) United States Patent
Vanhoof et al.

(10) Patent No.: US 6,298,049 B1
(45) Date of Patent: Oct. 2, 2001

(54) METHOD AND ARRANGEMENT FOR UPSTREAM TIMESLOT ASSIGNMENT, AND COMMUNICATION SYSTEM WHEREIN THE METHOD IS USED

(75) Inventors: Harry Franciscus Ludovica Vanhoof, Lille (BE); Robert Wolters, Montfort (NL)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/182,854

(22) Filed: Oct. 29, 1998

(30) Foreign Application Priority Data

Oct. 30, 1997 (EP) .................................................. 97402573

(51) Int. Cl.$^7$ ...................................................... H04J 3/16
(52) U.S. Cl. ........................................... 370/329; 370/442
(58) Field of Search ..................................... 370/329, 336, 370/337, 342, 341, 347, 431, 442, 443, 447, 440; 455/450, 452

(56) References Cited

U.S. PATENT DOCUMENTS

| 4,763,320 | | 8/1988 | Rudolph et al. ........................ 370/85 |
| 5,115,430 | * | 5/1992 | Hahne . |
| 5,239,545 | | 8/1993 | Buchholz ............................. 370/95.3 |
| 5,440,555 | | 8/1995 | Momona ................................ 370/79 |
| 5,463,624 | | 10/1995 | Hogg et al. ........................ 370/85.6 |
| 5,539,743 | * | 7/1996 | Amemiya et al. . |
| 5,677,906 | * | 10/1997 | Hayton et al. ....................... 370/235 |
| 5,774,453 | * | 6/1998 | Fukano et al. ....................... 370/231 |
| 5,828,653 | * | 10/1998 | Goss ..................................... 370/230 |
| 5,870,629 | * | 2/1999 | Borden et al. ........................ 395/864 |
| 6,104,700 | * | 8/2000 | Haddock ............................... 370/235 |

FOREIGN PATENT DOCUMENTS

| 0584820 | 3/1994 | (EP) . |
| 2162722 | 2/1986 | (GB) . |
| 9528786 | 10/1995 | (WO) . |
| 9739556 | 10/1997 | (WO) . |

OTHER PUBLICATIONS

"Integrated Data and Speech Transmission Using Packet Reservation Multiple Access", W. Wong et al, ICC '93 Geneva, IEEE International Conference on Communications '93, May 23–26, 1993, Geneva, Switzerland, pub. May 23, 1993, pp. 172–176.

* cited by examiner

*Primary Examiner*—Douglas Olms
*Assistant Examiner*—Ken Vanderpuye

(57) ABSTRACT

To assign upstream timeslots to network terminals (ANT1, ANT2, ANT3, ANT4) in a communication network wherein a common link (L) is shared in a time multiplexed way in the upstream direction from the network terminals (ANT1, ANT2, ANT3, ANT4) towards the main station (LIM), the main station (LIM) keeps track of at least one grant table (T1, T2) and at least one exceptional grant queue (Q1, Q2). The grant table (T1, T2) is scanned cyclically and the main station (LIM) downstream broadcasts a grant message for each entry of this grant table (T1, T2). This grant message assigns an upstream timeslot to the network terminal (ANT1) whose identifier (ID1) is memorized in the scanned table entry. If the scanned entry is empty, the main station (LIM) assigns an upstream timeslot to the network terminal (ANT2) whose identifier (ID2) is read from a non-empty exceptional grant queue (Q1, Q2).

7 Claims, 2 Drawing Sheets

METHOD AND ARRANGEMENT FOR UPSTREAM TIMESLOT ASSIGNMENT, AND COMMUNICATION SYSTEM WHEREIN THE METHOD IS USED

BACKGROUND OF THE INVENTION

1. Technical Field

The present invention relates to a method to assign an upstream timeslot to a network terminal, an arrangement adapted to perform this method, and a communication system wherein the method is used.

2. Discussion of Related Art

Such a method and related arrangement are already known in the art, e.g. from the U.S. Pat. No. 5,539,743, entitled 'Multiple Access System for Communication Network'. Therein, a communications system is disclosed wherein a plurality of network terminals, named substations, are coupled to a main station via a network with multipoint-to-point architecture. A substation upon request is assigned an upstream timeslot that is used for transmission of an upstream data burst towards the main station. This is done by the main station which downstream broadcasts so called data transmission enable signals (TENO) or grant messages that define for each upstream timeslot to which substation it is assigned. The main station keeps track of a time table or grant table wherein the different substations occupy entries based on their requests for upstream bandwidth. This table is scanned at regular time intervals and the substation whose identifier is stored in the scanned entry is assigned a timeslot via a grant message. As indicated in column 11, lines 30–37, of the cited United States Patent, the main station gives authority to an arbitrary substation to occupy an upstream timeslot if the scanned table entry is empty.

The solution known from U.S. Pat. No. 5,539,743 lacks an optimal decision criterion for selecting the substation which is given the allowance to send an upstream burst in case the scanned entry in the time table is empty. In the known method, an arbitrary substation is given the allowance. This arbitrary selected substation however may have no data available for upstream transmission whereas other substations which do not get access to the free upstream timeslots have lots of data waiting to be transferred.

SUMMARY OF THE INVENTION

An object of the present invention is to provide a method and related equipment of the above known type, but wherein the substations which are assigned an upstream timeslot in case of absence of substation identifiers in the grant table, are selected in a more efficient way.

According to a first aspect of the invention, a method to assign an upstream timeslot to a network terminal via a grant message, said method for use in a communication network wherein a main station is coupled to a plurality of network terminals via a cascade connection of a common link and respective individual links, and wherein said network terminals transmit upstream bursts towards said main station in a time division multiplexed way over said common link in upstream timeslots assigned thereto, comprises the steps of scanning in said main station an entry of a grant table wherein a list of terminal identifiers is memorized, generating said grant message and embedding therein a terminal identifier memorized in said entry of said grant table, and downstream broadcasting said grant message, wherein said method further comprises the steps of reading, if said entry of said grant table is empty, a terminal identifier from an exceptional grant queue, and embedding said terminal identifier read from said exceptional grant queue in said grant message before it is broadcasted.

In accordance with a second aspect of the invention, an arrangement adapted to assign an upstream timeslot to a network terminal via a grant message, said arrangement for use in a communications network wherein a main station is coupled to a plurality of network terminals via a cascade connection of a common link and respective individual links, said network terminals for transmitting upstream bursts towards said main station in a time division multiplexed way over said common link in upstream timeslots assigned thereto, comprises at least one grant table memory, for memorizing a list of terminal identifiers, scanning means to at least one input of which outputs of said at least one grant table memory are coupled, said scanning means for scanning an entry of said at least one grant table memory and for applying a terminal identifier read from said entry to an output thereof, grant message generating means, to an input of which said output of said table scanning means is coupled, said grant message generating means for generating said grant message and for embedding said terminal identifier received from said scanning means in said grant message, transmitting means, coupled to said grant message generating means, for broadcasting said grant message, and at least one exceptional grant queue memory, for memorizing terminal identifiers of network terminals that request exceptional additional bandwidth, wherein said scanning means is equipped with at least one additional input whereto outputs of said at least one exceptional grant queue are coupled, said scanning means for scanning an entry of said at least one exceptional grant queue memory if said entry of said grant table memory is empty, and for providing a terminal identifier read from said entry of said exceptional grant queue memory to said grant message generation means.

According to a third aspect of the invention, a communication system comprises a main station and a plurality of network terminals coupled to said main station via a cascade connection of a common link and respective individual links, said network terminals for transmitting upstream bursts towards said main station in a time division multiplexed way over said common link in upstream timeslots assigned thereto by said main station, and said main station for assigning an upstream timeslot to a network terminal via a grant message, whereby said main station comprises at least one grant table memory for memorizing a list of terminal identifiers, scanning means to at least one input of which outputs of said at least one grant table memory are coupled, said scanning means for scanning an entry of said at least one grant table memory and for applying a terminal identifier read from said entry to an output thereof, grant message generating means, to an input of which said output of said table scanning means is coupled, said grant message generating means for generating said grant message and for embedding said terminal identifier received from said scanning means in said grant message, and transmitting means, coupled to said grant message generating means, for broadcasting said grant message, and at least one exceptional grant queue memory, for memorizing terminal identifiers of network terminals that request exceptional additional bandwidth, wherein said scanning means is equipped with at least one additional input whereto outputs of said at least one exceptional grant queue are coupled, said scanning means for scanning an entry of said at least one exceptional grant queue memory if said entry of said grant table memory is empty, and for applying a terminal identifier read from said entry of said exceptional grant queue memory to said grant message generation means.

In this way, by providing an exceptional grant queue that is consulted each time an empty entry is scanned in the grant table, assignment of upstream timeslots is managed so that network terminals with the highest needs for exceptional additional bandwidth receive most exceptional grant messages. In case a network terminal needs a single sequence of grant messages for exceptional transmission of a data packet, its terminal identifier may be written in subsequent entries of the exceptional grant queue, so that a sequence of upstream timeslots that would be assigned at random to network terminals in the known method, becomes now assigned to this network terminal with special needs. The request of a network terminal for exceptional additional bandwidth, i.e. bandwidth that supersedes the negotiated minimum bandwidth to be delivered to a network terminal, can be handled in a similar way via the exceptional grant queue. Concluding, the exceptional grant queue allows to assign free upstream timeslots to terminal stations which are willing to get additional grant messages and thus improves the efficiency of the use of network resources. Compared to the known method, the present invention avoids random assignment of free upstream timeslots to network terminals that do not need it.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noted that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

In further accord with the first aspect of the invention, the exceptional grant queue has a highest priority level among a plurality of exception grant queues that are not empty.

In this way, a terminal identifier of a network terminal requesting exceptional additional bandwidth, can be queued in one of the exceptional grant queues depending on the priority that has to be given to this bandwidth request. Exceptional bandwidth requests thus are not treated on a first-in-first-out basis as would be the case if only one exceptional grant queue would be provided. Certain priority levels can be taken into account.

Moreover, the priority level can be related to a quality of service of data to be transmitted by network terminals whose terminal identifiers are memorized therein.

Thus, in a network that supports quality of service (QoS) such as an asynchronous transfer mode (ATM) network, the quality of service class of the upstream data to be transmitted by a network terminal determines the priority of the corresponding request for exceptional bandwidth and consequently the exceptional grant queue whose entries are filled with the terminal identifier of this network terminal. ABR (Available Bit Rate) traffic may for instance be given a lower priority than CBR (Constant Bit Rate) and VBR (Variable Bit Rate) traffic in a system with two exceptional grant queues.

In still further accord with the first aspect of the invention, a terminal identifier is memorized in said exceptional grant queue upon request for exceptional bandwidth by a network terminal identified by said terminal identifier.

As already explained briefly above, the exceptional grant queue may be used to manage upstream timeslot assignment to network terminals which temporarily ask for some additional bandwidth, exceeding the negotiated minimum bandwidth.

Still further in accord with the first aspect of the invention, a terminal identifier is memorized in the exceptional grant queue upon request for a unique sequence of grant messages by a network terminal identified by said terminal identifier.

Hence, as also indicated earlier in this document, the exceptional grant queue may be used to manage upstream timeslot assignment to network terminals which announce transmission of a single upstream data train. Such a transmission normally would require adaptation of the grant table before and after transfer of the data train. An exceptional grant queue however is more suited to handle such requests than the grant table since the queue is updated automatically once a grant message is sent to the network terminal.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

DETAILED DESCRIPTION OF PREFERRED EMBODIMENTS

Figure 1:
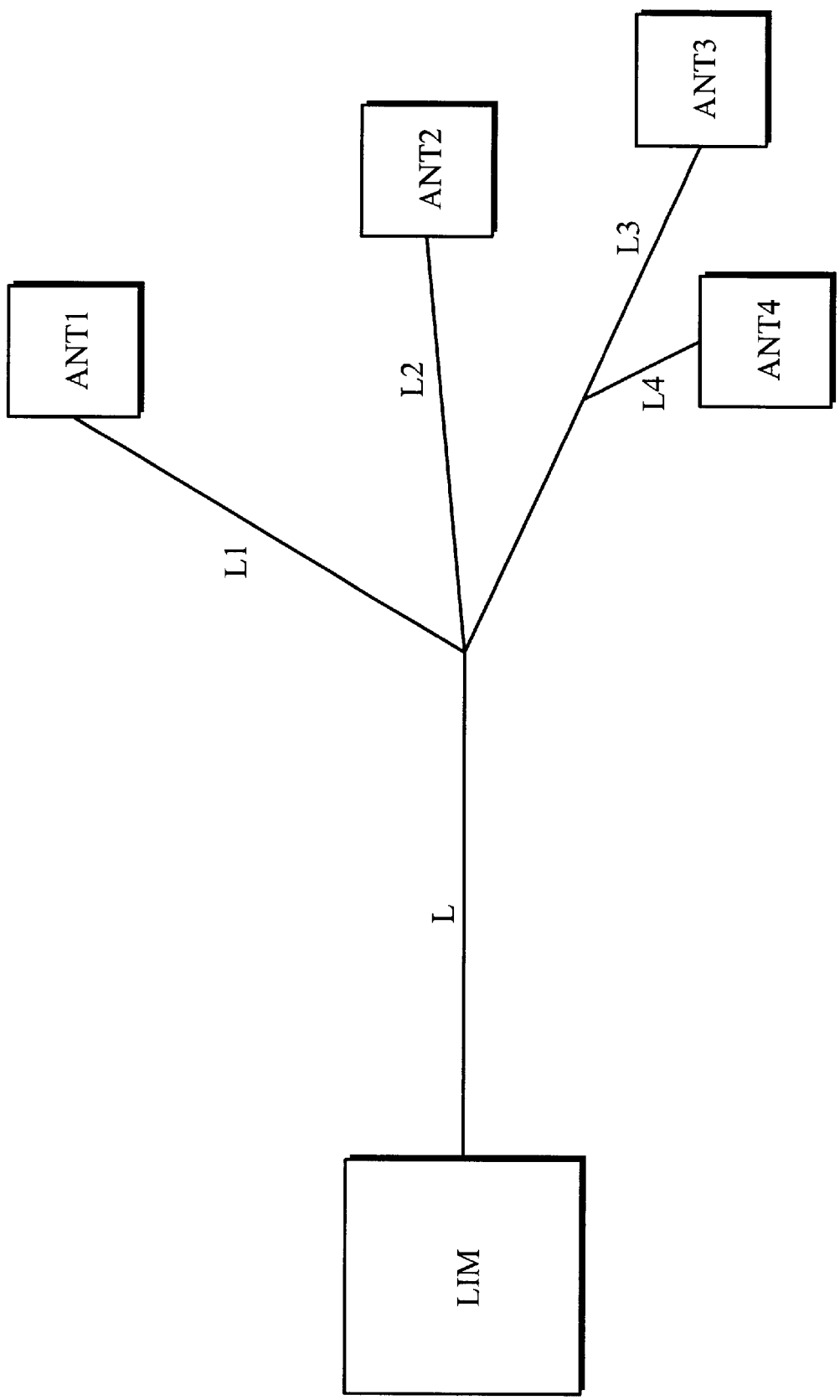
FIG. 1 represents a communication system wherein a method according to the present invention is applied.

In the communication system drawn in FIG. 1, a main station or line interface module LIM is coupled to four network terminals ANT1, ANT2, ANT3 and ANT4 via the cascade connection of a common link L and respective individual links L1, L2, L3 and L4.

The network constituted by the links L, L1, L2, L3 and L4 has a point-to-multipoint architecture in the downstream direction, i.e. the direction from the main station LIM to the network terminals ANT1, ANT2, ANT3 and ANT4, and a multipoint-to-point architecture in the upstream direction, i.e. the direction from the network terminals ANT1, ANT2, ANT3 and ANT4 towards the main station LIM. Data are transferred bi-directionally over this network. In the downstream direction, the main station LIM broadcasts data empacked in ATM (Asynchronous Transfer Mode) cells to all network terminals, ANT1, ANT2, ANT3 and ANT4. In the upstream direction, the network terminals ANT1, ANT2, ANT3 and ANT4 transmit data empacked in ATM cells towards the main station LIM in such a way that the common link L is shared in time between the different network terminals ANT1, ANT2, ANT3 and ANT4. The network terminals ANT1, ANT2, ANT3 and ANT4 in other words share the common link L in a time division multiplexed way for upstream transmission, which means that upstream bursts from different network terminals are transmitted in different timeslots over the common link L. To assign such an upstream timeslot to a particular network terminal and to avoid that more than one network terminal attempt to occupy the same timeslot for transmission of an upstream burst, the main station LIM determines for each upstream timeslot which one of the network terminals ANT1, ANT2, ANT3 and ANT4 is allowed to occupy it. The network terminals ANT1, ANT2, ANT3 and ANT4 are informed about the assignment of upstream timeslots via grant messages that are downstream broadcasted by the main station LIM. Such a grant message contains the terminal identifier, ID1, ID2, ID3 or ID4, of the network terminal, ANT1, ANT2, ANT3 or ANT4, that is allowed to send an upstream burst in the upstream timeslot where the grant message is related to. To obtain a fair assignment of upstream timeslots to network terminals, the main station LIM takes into account minimum traffic rates negotiated between the users which own the network terminals ANT1, ANT2, ANT3 and ANT4, and the network operator. These negotiated traffic rates are specified in a traffic contract made up between the players. Requests for grants received from the network terminals ANT1, ANT2, ANT3 and ANT4, and the quality of service classes of the data to be transmitted to the main station LIM are also taken into account to fairly distribute the upstream timeslots over the network terminals ANT1, ANT2, ANT3 and ANT4. In an ATM (Asynchronous Transfer Mode) network such as the one drawn in FIG. 1, data are indeed classified in different quality of service classes such as CBR (Constant Bit Rate), VBR (Variable Bit Rate), UBR (Unspecified Bit Rate) or ABR (Available Bit Rate) depending on the transmit requirements of these data with respect to delay, bit error rate, cell loss, and so on. Since some quality of service classes have priority over others it is evident that the quality of service classes of data to be transferred in the upstream direction over the common link L can have an influence on the assignment of timeslots to the network terminals ANT1, ANT2, ANT3, and ANT4.

Figure 2:
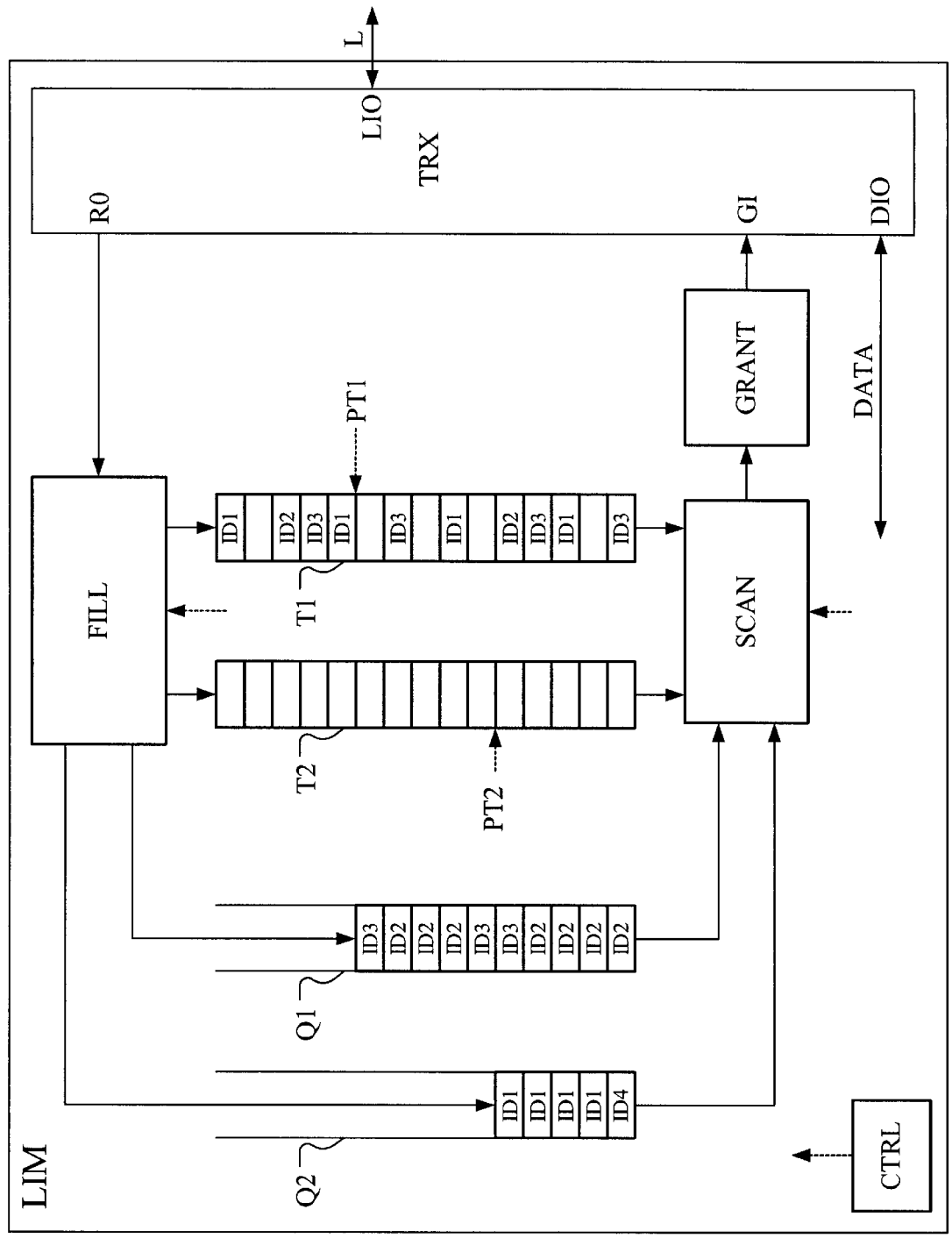
FIG. 2 is a schematic block diagram of the central station LIM of FIG. 1 including an arrangement for upstream timeslot assignment according to the present invention.

The main station or line interface module LIM of FIG. 1 is drawn in more detail in FIG. 2. The drawn main station LIM includes a transceiver TRX, a first grant table memory T1, a second grant table memory T2, a first exceptional grant queue Q1, a second exceptional grant queue Q2, a filling device FILL, a scanning device SCAN, a grant message generator GRANT and a control unit CTRL.

The transceiver TRX is provided with a request output RO, a grant input GI, a data input/output port DIO and a line input/output port LIO. Via the latter line input/output port LIO the transceiver TRX is coupled to the common link L that is also drawn in FIG. 1. The filling device FILL has 4 outputs coupled to write inputs of the grant table memories T1 and T2, and the exceptional grant queues Q1 and Q2 respectively. To an input of the filling device FILL the request output RO of the transceiver TRX is coupled. Read outputs of the grant table memories T1 and T2, and of the exceptional grant queues Q1 and Q2 are connected to respective inputs of the scanning device SCAN. An output of the latter scanning device SCAN is interconnected with an input of the grant message generator GRANT, and this grant message generator GRANT further is coupled via an output thereof to the grant input GI of the transceiver TRX. The control unit CTRL drawn in FIG. 2 controls the operation of the filling device FILL, the scanning device SCAN and the grant table memories T1 and T2 and thereto is coupled to control inputs of these components. To avoid overloading the drawing, the control lines between the control unit CTRL and each one of the just listed components controlled thereby, FILL, SCAN, T1 and T2, are not drawn but replaced by dotted arrows representing the control inputs of the controlled components and the control output of the control unit CTRL respectively. Two of the control inputs, the one of grant table memory T1 and that of grant table memory T2, are labelled as pointer PT1 of table T1 and pointer PT2 of table T2. The data input/output port DIO of the transceiver TRX is coupled to a bi-directional data bus DATA which may be coupled to data processing equipment inside or outside the main station LIM. This data processing equipment is not drawn in the figure FIG. 2.

To explain the working of the functional blocks drawn in FIG. 2, it is supposed that the main station LIM has received requests for grants from the network terminals ANT1, ANT2 and ANT3. On the basis of these requests and the negotiated minimum rates specified in the traffic contracts between owners of the terminals ANT1, ANT2, ANT3, ANT4 and the network operator, the filling device FILL calculates how the grant table memory T1 should be filled with terminal identifiers ID1, ID2, ID3, ID4 in order to obtain a fair share of the upstream capacity of the common link L over the different network terminals ANT1, ANT2, ANT3 and ANT4. The filling device FILL, when having finished its calculations, writes the results of these calculations in the grant table memory T1. The status of the grant table memory T1 after this write process is shown in FIG. 2. As can be seen from FIG. 2, network terminal ANT4 does not occupy any entry in the grant table memory T1 because it didn't request any grant. The other network terminals ANT1, ANT2 and ANT3 occupy 4, 2 and 4 entries of the first grant table memory T1 respectively. The entries of the grant table memory T1 filled with one and the same terminal identifier, ID2 for instance, are spread over the whole table so that the corresponding network terminal ANT2 is allowed to occupy upstream timeslots which are more or less equidistant in time. In this way, each network terminal can transmit upstream data bursts approximately at a constant data rate. Once the grant table memory T1 is filled by the filling device FILL, the scanning device SCAN starts scanning the entries of the grant table memory T1 in a cyclic way. For each entry of the grant table memory T1, the scanning device SCAN reads the terminal identifier memorized therein and supplies the read terminal identifier to the grant message generator GRANT. The grant message generator GRANT upon receipt of the terminal identifier from the scanning device SCAN, generates a grant message wherein the received terminal identifier is embedded and applies this grant message to the grant input GI of the transceiver TRX. The transceiver TRX downstream broadcasts the grant message towards the network terminals ANT1, ANT2, ANT3 and ANT4.

While the scanning device SCAN is scanning the first grant table memory T1 cyclically, the filling device FILL determines the contents of the second grant table memory T2 on the basis of new requests received from the network terminals ANT1, ANT2, ANT3 and ANT4. Once the second grant table T2 is filled by the filling device FILL, the scanning device SCAN swaps from scanning the first grant table T1 to scanning the second grant table T2. The first and second grant table memories, T1 and T2, thus change roles in an alternating way. While one grant table memory is read by the scanning device SCAN, the other is filled by the filling device FILL. The scan and fill operations are controlled by the control unit CTRL. This control unit CTRL in other words keeps track of the pointers PT1 and PT2 which determine the entries of the tables T1 and T2 that are scanned or filled respectively, and controls the filling device FILL and scanning device SCAN so that they do not operate simultaneously on the same grant table memory.

Suppose now that the main station LIM receives an exceptional request from network terminal ANT2. Therein, this network terminal ANT2 asks to get assigned 4 upstream timeslots in addition to its negotiated minimum bandwidth for transmission of CBR (Constant Bit Rate) data. The filling device FILL, which receives this exceptional request from the transceiver TRX, recognizes that this request is exceptional and consequently does not take this request into account for determining the contents of one of the grant table memories T1 or T2. Instead, the filling means FILL fills 4 entries in exceptional grant queue Q1 with the identifier ID2 of the network terminal ANT2. In a similar way, network terminal ANT4 sends an exceptional request for 1 upstream timeslot to the central station LIM. In this exceptional request, network terminal ANT4 specifies that this timeslot will be used for transfer of ABR (Available Bit Rate) traffic as a result of which the filling device FILL writes the identification ID4 of network terminal ANT4 in one entry of the second exceptional grant queue Q2. This second exceptional grant queue Q2 is used to queue exceptional requests for data of the ABR (Available Bit Rate) class, which have a lower priority than data belonging to the CBR or VBR quality of service classes. Exceptional requests for upstream transmission of data of the latter three classes are queued in the first exceptional grant queue Q1. Doing so an additional exceptional request for transmission of ABR data in 4 upstream timeslots, originated by network terminal ANT1, is queued in exceptional grant queue Q2, as shown in FIG. 2. Still other exceptional requests from network terminals ANT3 and ANT2 for upstream transmission of non-ABR traffic are queued in Q1.

If the scanning device SCAN, which cyclically runs over the entries of one of the grant table memories T1 and T2, encounters an empty entry, the scanning device SCAN reads the terminal identifier out of the oldest entry in the non-empty queue with highest priority amongst queues Q1 and Q2. In FIG. 2, this means that the lowest entry of exceptional grant queue Q1 is scanned unless this entry is empty. If this entry is empty, exceptional grant queue Q1 contains no filled entries as a result of which the scanning device SCAN will consult the lowest entry of exceptional grant queue Q2. Whereas the contents of the grant table memories T1 and T2 remains unchanged while the scanning means SCAN is cyclically reading entries thereof, the contents of the exceptional grant queues Q1 and Q2 changes each time an entry thereof is read by the scanning device SCAN. The lowest or oldest entry in the queue is read and therefore disappears, while all other entries in the read queue decrease one step. Thus, according to the present invention, an upstream timeslot is assigned to a network terminal which has sent an exceptional request towards the main station LIM each time the scanned grant table, T1 or T2, includes an empty entry. The exceptional requests may be treated in a first-in-first-out order but a priority level associated with the quality of service class of the data can be taken into account as well.

It is noted that, besides the receipt of request messages and exceptional request messages, and the transmission of grant messages, the transceiver TRX also receives and transmits all other data. This is indicated in FIG. 2 by the data input/output port DIO and the bi-directional data bus DATA.

It is to be remarked that the applicability of the present invention is not restricted by the transmission medium via which data are transported. In any network with a multipoint-to-point architecture wherein terminals share common links in a time multiplexed way, independent of the fact that these links are twisted pair telephone lines, coaxial cable connections, satellite connections, or radio links through the air, upstream timeslot assignment may be optimized according to the present invention.

Another remark is that the principles of the present invention are illustrated by describing the functional blocks in FIG. 2. Each block drawn in this figure is described by explaining the functions it performs rather than by the electronic components it contains. From the functional description above, any person skilled in the art of designing micro-electronic components can develop detailed electronic circuitry realizing these functions. For this reason, no further details with respect to the electronic components of the blocks were given.

Yet another remark is that implementation of the present invention requires no adaptations in the network terminal ANT1, ANT2, ANT3 and ANT4. The filling device FILL in the main station LIM may be capable of recognizing exceptional grant requests, e.g. by noticing that the requested bandwidth exceeds the negotiated minimum bandwidth. Alternatively, the network terminals ANT1, ANT2, ANT3 and ANT4 themselves may be capable to mark a grant request as exceptional, for instance by setting one reserved bit therein, so that the filling device FILL needs no additional intelligence to be able to recognizing exceptional request messages. In the latter implementation of the present invention, minor additional hardware or software is required in the network terminals ANT1, ANT2, ANT3 and ANT4 to be able to mark the request messages as exceptional.

Still another remark is that the simplest version of the present invention contains only one exceptional grant queue. In this implementation, all exceptional grant requests are treated on a first-in-first-out basis, and the complexity of managing several exceptional grant queues, each having another associated priority, is avoided. The complexity of the filling device FILL and scanning device SCAN then is reduced significantly compared to the above described implementations of the present invention with two or more exceptional grant queues.

Furthermore, it is noticed that the complexity of the filling device FILL, scanning device SCAN and control unit CTRL can even more be reduced if only one grant table memory T1 is used instead of two. The use of only one grant table memory T1 however implies the existence of transition states wherein both the filling device FILL and scanning device SCAN operate on this single grant table memory T1. During such transition states, the actual contents of the entries of the grant table memory depends on the relative writing and reading speeds of the filling device FILL and scanning device SCAN.

While the principles of the invention have been described above in connection with specific apparatus, it is to be clearly understood that this description is made only by way of example and not as a limitation on the scope of the invention.

What is claimed is:

1. Method to assign an upstream timeslot to a network terminal (ANT1, ANT2, ANT3, ANT4) via a grant message, said method for use in a communication network wherein a main station (LIM) is coupled to a plurality of network terminals (ANT1, ANT2, ANT3, ANT4) via a cascade connection of a common link (L) and respective individual links (L1, L2, L3, L4), and wherein said network terminals (ANT1, ANT2, ANT3, ANT4) transmit upstream bursts towards said main station (LIM) in a time division multiplexed way over said common link (L) in upstream timeslots assigned thereto, said method comprising the steps of:

a. scanning in said main station (LIM) an entry of a grant table (T1) wherein a list of terminal identifiers (ID1, ID2, ID3, ID4) is memorized;

b. generating said grant message and embedding therein a terminal identifier (ID1) memorized in said entry of said grant table (T1); and c. downstream broadcasting said grant message, wherein said method further comprises the steps of:

d. reading, if said entry of said grant table (T1) is empty, a terminal identifier (ID2) from an exceptional grant queue (Q1); and e. embedding said terminal identifier (ID2) read from said exceptional grant queue (Q1) in said grant message before it is broadcasted.

2. Method according to claim 1, wherein said exceptional grant queue (Q1) has a highest priority level among a plurality of exceptional grant queues (Q1, Q2) that are not empty.

3. Method according to claim 2, wherein said priority level relates to a quality of service of data to be transmitted by network terminals whose terminal identifiers are memorized therein.

4. Method according to claim 1, wherein a terminal identifier (ID2) is memorized in said exceptional grant queue (Q1) upon request for exceptional bandwidth by a network terminal (ANT2) identified by said terminal identifier (ID2).

5. Method according to claim 1 wherein a terminal identifier (ID2) is memorized in said exceptional grant queue (Q1) upon request for a unique sequence of grant messages by a network terminal (ANT2) identified by said terminal identifier (ID2).

6. Arrangement adapted to assign an upstream timeslot to a network terminal (ANT1, ANT2, ANT3, ANT4) via a grant message, said arrangement for use in a communications network wherein a main station (LIM) is coupled to a plurality of network terminals (ANT1, ANT2, ANT3, ANT4) via a cascade connection of a common link (L) and respective individual links (L1, L2, L3, L4), said network terminals (ANT1, ANT2, ANT3, ANT4) for transmitting upstream bursts towards said main station (LIM) in a time division multiplexed way over said common link (L) in upstream timeslots assigned thereto, said arrangement comprising:

a. at least one grant table memory (T1, T2), for memorizing a list of terminal identifiers (ID1, ID2, ID3, ID4);

b. scanning means (SCAN) to at least one input of which outputs of said at least one grant table memory (T1, T2) are coupled, said scanning means (SCAN) for scanning an entry of said at least one grant table memory (T1, T2) and for applying a terminal identifier (ID1) read from said entry to an output thereof;

c. grant message generating means (GRANT), to an input of which said output of said table scanning means (SCAN) is coupled, said grant message generating means (GRANT) for generating said grant message and for embedding said terminal identifier (ID1) received from said scanning means (SCAN) in said grant message;

d. transmitting means (TRX), coupled to said grant message generating means (GRANT), for broadcasting said grant message; and e. at least one exceptional grant queue memory (Q1, Q2), for memorizing terminal identifiers of network terminals that request exceptional additional bandwidth, wherein said scanning means (SCAN) is equipped with at least one additional input whereto outputs of said at least one exceptional grant queue (Q1, Q2) are coupled, said scanning means (SCAN) for scanning an entry of said at least one exceptional grant queue memory (Q1, Q2) if said entry of said grant table memory (T1) is empty, and for providing a terminal identifier (ID2) read from said entry of said exceptional grant queue memory (Q1, Q2) to said grant message generation means (GRANT).

7. Communication system comprising a main station (LIM) and a plurality of network terminals (ANT1, ANT2, ANT3, ANT4) coupled to said main station (LIM) via a cascade connection of a common link (L) and respective individual links (L1, L2, L3, L4), said network terminals (ANT1, ANT2, ANT3, ANT4) for transmitting upstream bursts towards said main station (LIM) in a time division multiplexed way over said common link (L) in upstream timeslots assigned thereto by said main station (LIM), and said main station for assigning an upstream timeslot to a network terminal (ANT1, ANT2, ANT3, ANT4) via a grant message, said main station comprising:

a. at least one grant table memory (T1, T2), for memorizing a list of terminal identifiers (ID1, ID2, ID3, ID4);

b. scanning means (SCAN) to at least one input of which outputs of said at least one grant table memory (T1, T2) are coupled, said scanning means (SCAN) for scanning an entry of said at least one grant table memory (T1, T2) and for applying a terminal identifier (ID1) read from said entry to an output thereof;

c. grant message generating means (GRANT), to an input of which said output of said table scanning means (SCAN) is coupled, said grant message generating means (GRANT) for generating said grant message and for embedding said terminal identifier (ID1) received from said scanning means (SCAN) in said grant message; and d. transmitting means (TRX), coupled to said grant message generating means (GRANT), for broadcasting said grant message; and e. at least one exceptional grant queue memory (Q1, Q2), for memorizing terminal identifiers of network terminals that request exceptional additional bandwidth, wherein said scanning means (SCAN) is equipped with at least one additional input whereto outputs of said at least one exceptional grant queue (Q1, Q2) are coupled, said scanning means (SCAN) for scanning an entry of said at least one exceptional grant queue memory (Q1, Q2) if said entry of said grant table memory (T1) is empty, and for applying a terminal identifier (ID2) read from said entry of said exceptional grant queue memory (Q1, Q2) to said grant message generation means (GRANT).

* * * * *